United States Patent
Song et al.

(10) Patent No.: US 12,283,080 B2
(45) Date of Patent: Apr. 22, 2025

(54) METHOD OF EXTRACTING AND LABELING CONNECTED ELEMENTS IN IMAGES

(71) Applicant: Fourth Logic Incorporated, Gyeonggi-do (KR)

(72) Inventors: Jong Hyun Song, Gyeonggi-do (KR); Jun Young Choi, Gyeonggi-do (KR)

(73) Assignee: Fourth Logic Incorporated, Gyeonggi-do (KR)

( * ) Notice: Subject to any disclaimer, the term of this patent is extended or adjusted under 35 U.S.C. 154(b) by 467 days.

(21) Appl. No.: 17/751,631

(22) Filed: May 23, 2022

(65) Prior Publication Data

US 2023/0222759 A1    Jul. 13, 2023

(30) Foreign Application Priority Data

Jan. 7, 2022   (KR) .................. 10-2022-0002711

(51) Int. Cl.
*G06T 7/13*      (2017.01)
*G06T 7/32*      (2017.01)
*G06T 7/70*      (2017.01)
*G06V 10/44*     (2022.01)
*G06V 10/75*     (2022.01)

(52) U.S. Cl.
CPC .............. *G06V 10/457* (2022.01); *G06T 7/13* (2017.01); *G06T 7/32* (2017.01); *G06T 7/70* (2017.01); *G06V 10/751* (2022.01)

(58) Field of Classification Search
CPC ...... G06V 10/457; G06V 10/751; G06T 7/13; G06T 7/32; G06T 7/70
See application file for complete search history.

(56) References Cited

U.S. PATENT DOCUMENTS

| | | | |
|---|---|---|---|
| 8,675,256 B2 * | 3/2014 | Tsunematsu | G06T 7/90 358/1.9 |
| 10,019,807 B1 * | 7/2018 | Kwon | G06T 7/11 |
| 2005/0163381 A1 * | 7/2005 | Ozaki | G06V 10/955 382/199 |
| 2009/0196502 A1 * | 8/2009 | Sullender | G06V 10/267 382/180 |

(Continued)

FOREIGN PATENT DOCUMENTS

KR    102002024    7/2019

*Primary Examiner* — Hadi Akhavannik
*Assistant Examiner* — Dion J Satcher
(74) *Attorney, Agent, or Firm* — JCIPRNET (57) ABSTRACT

The present disclosure relates to a method of extracting and labeling connected elements in images, and more particularly, to a method of detecting connected elements formed as pixels are connected to one another in images and assigning label numbers thereto. A method of extracting and labeling connected elements of images of the present disclosure has the effect of improving productivity by quickly and effectively performing detection and grouping of connection element objects in an image and assigning label numbers thereto by using a small number of operations. A method of extracting and labeling connected elements of images of the present disclosure has an effect of accurately extracting and labeling connected elements without an error even when the shape of the connected elements of an image is complicated.

13 Claims, 11 Drawing Sheets

(56) References Cited

U.S. PATENT DOCUMENTS

| | | | |
|---|---|---|---|
| 2009/0309979 A1* | 12/2009 | Yang | G06V 10/457 |
| | | | 348/206 |
| 2017/0309251 A1* | 10/2017 | Saruhashi | G09G 5/10 |
| 2019/0244359 A1* | 8/2019 | Kariya | G06T 7/11 |
| 2021/0019892 A1* | 1/2021 | Zhou | G06V 40/162 |
| 2021/0019893 A1* | 1/2021 | Ananthanarayanan | G06N 3/08 |

* cited by examiner

METHOD OF EXTRACTING AND LABELING CONNECTED ELEMENTS IN IMAGES

CROSS-REFERENCE TO RELATED APPLICATION

This application is based on and claims priority under 35 U.S.C. § 119 to Korean Patent Application No. 10-2022-0002711, filed on Jan. 7, 2022, in the Korean Intellectual Property Office, the disclosure of which is incorporated by reference herein in its entirety.

BACKGROUND

1. Field

The present disclosure relates to a method of extracting and labeling connected elements in images, and more particularly, to a method of detecting connection element objects formed as pixels are connected to one another in images and assigning label numbers thereto.

2. Description of the Related Art

In the image processing field, an image expresses various features through combinations of pixels constituting the image. In the field of extracting and processing image features, it is sometimes necessary to extract, group, and classify pixels bordering on one another under conditions defined by a user.

Conventionally, in order to extract a group of pixels that are connected to one another, a method of repeatedly confirming pixels in a total of 8 directions including horizontal directions, vertical direction, and diagonal directions for all pixels constituting an image has been used. When pixels bordering on each other are confirmed as being connected to each other, it is necessary to repeat the procedure of sequentially checking each of other pixels nearby and manage results of the procedure as a table.

In the case of using such a method, the larger an image to be examined is, the greater the number of operations and the larger the amount of a memory required to perform the operations need to be. Therefore, the time required for identifying, extracting, and grouping connection element objects in an image also increases.

Therefore, when it is necessary to process high-quality images or to process images including a large number of frames in real time, the conventional method is not practical.

Also, although a technique related to checking and labeling connected elements bordering on to each other by scanning rows and columns has been developed, an accurate result cannot be obtained by using this technique when the shapes of connected elements in an image are very complicated.

SUMMARY

Provided is a method of extracting and labeling connected elements of images capable of finding and grouping connected elements in an image and assigning label numbers to the respective connected elements with a small operation cost reduced as much as possible and obtaining accurate results for connected elements with complicated shapes.

Additional aspects will be set forth in part in the description which follows and, in part, will be apparent from the description, or may be learned by practice of the presented embodiments of the disclosure.

According to an aspect of the embodiment, a method of extracting and labeling connected elements of images by examining pixels of an image and recognizing and extracting connected elements formed as pixels bordering on one another are connected to one another, the method includes operation (a), by a first label module, of searching pixels of the image in a horizontal direction, extracting pixels connected to each other in the same row as connection element objects, and sequentially assigning identification numbers and label numbers to the connection element objects; operation (b), by a second label module, of sequentially extracting the connection element objects connected to each other from rows bordering on each other; operation (c), by the second label module, of setting label numbers p and c of the connection element objects connected to each other to initial head values Hp and Hc, respectively, and obtaining final head values Hp and Hc of the connection element objects connected to each other by repeating Equation 1 below until head values Hp and Hc updated by Equation 1 and label numbers L[Hp] and L[Hc] of connection element objects having the head values Hp and Hc as identification numbers thereof have the same values, respectively; operation (d), by the second label module, of setting a smallest value of the label numbers p and c of the connection element objects connected to each other in rows bordering on each other and the final head values Hp and Hc of the connection element objects connected to each other as a renew label number $L_{new}$; and operation (e), by the second label module, of updating the label numbers p and c of the connection element objects connected to each other and the label numbers L[Hp] and L[Hc] of the connection element objects having the final head values Hp and Hc as the identification numbers thereof to the renew label number $L_{new}$, wherein, after operation (a) is performed, the second label module sequentially performs the operations (b) to (e) for all rows bordering on each other.

$$H \leftarrow L[H] \quad \text{[Equation 1]}$$

H: head value, L[H]: label number of a connected element with an identification number H A method of extracting and labeling connected elements of images of the present disclosure has the effect of improving productivity by quickly and effectively performing detection and grouping of connected elements in an image and assigning label numbers thereto by using a small number of operations.

A method of extracting and labeling connected elements of images of the present disclosure has an effect of accurately extracting and labeling connected elements without an error even when the shape of the connected elements of an image is complicated.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a method of extracting and labeling connected elements of images according to an embodiment of the present disclosure will be described with reference to the accompanying drawings.

Figure 1:
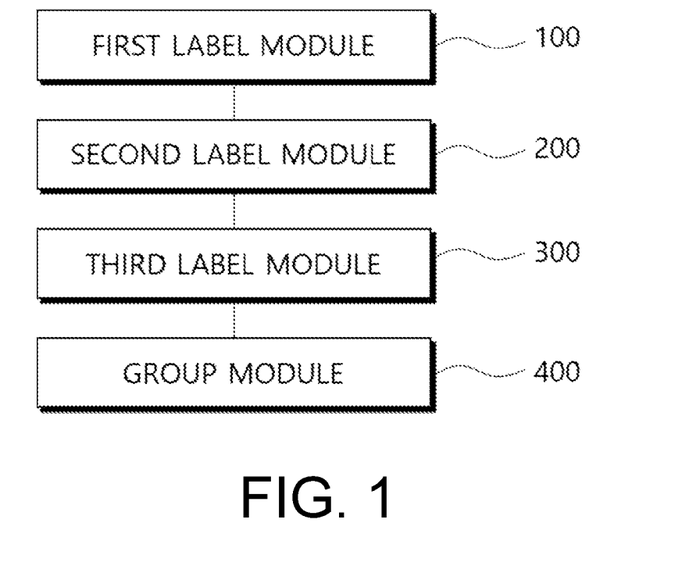
FIG. 1 is a block diagram of an apparatus for executing a method of extracting and labeling connected elements of images according to an embodiment of the present disclosure.
Figure 2:
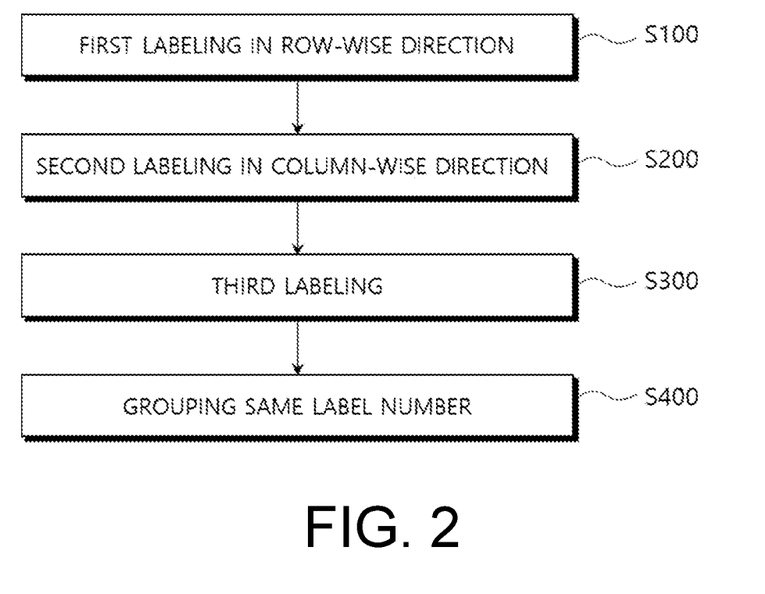
FIG. 2 is a flowchart of a method of extracting and labeling connected elements of images according to an embodiment of the present disclosure.

FIG. 1 is a block diagram of an apparatus for executing a method of extracting and labeling connected elements of images according to an embodiment of the present disclosure, and FIG. 2 is a flowchart of a method of extracting and labeling connected elements of images according to an embodiment of the present disclosure.

The method of extracting and labeling connected elements of images of the present disclosure is for identifying and extracting connection element objects including pixels each connected to adjacent pixels and assigning a unique label number to each independent connection element objects.

Referring to FIG. 1, an apparatus for performing the method of extracting and labeling connected elements of images according to the present embodiment includes a first label module 100, a second label module 200, a third label module 300, and a group module 400.

With reference to FIG. 2, a process of performing the method of extracting and labeling connected elements of images according to the present embodiment by using the apparatus for executing the method of extracting and labeling connected elements of images configured as stated above will be briefly described below.

The first label module 100 searches pixels of an image in a row-wise direction, extracts connection element objects, which are sets of pixels connected to one another, and assigns a label number and an identification number to each connected element (operation (a); S100).

The second label module 200 compares rows of the image bordering on each other, recognizes connection element objects connected to one another in the vertical direction among connection element objects belonging to respective rows, and updates the label numbers of recognized connection element objects to have the same label number (operations (b) to (e); S200).

The third label module 300 compensates for incompleteness that may occur in the process that the second label module 200 updates the label number of the connection element objects (operation (f); S300).

The group module 400 extracts and groups connection element objects having the same label number among connection element objects having label numbers updated by the third label module 300 (operation (g); S400).

Figure 5:
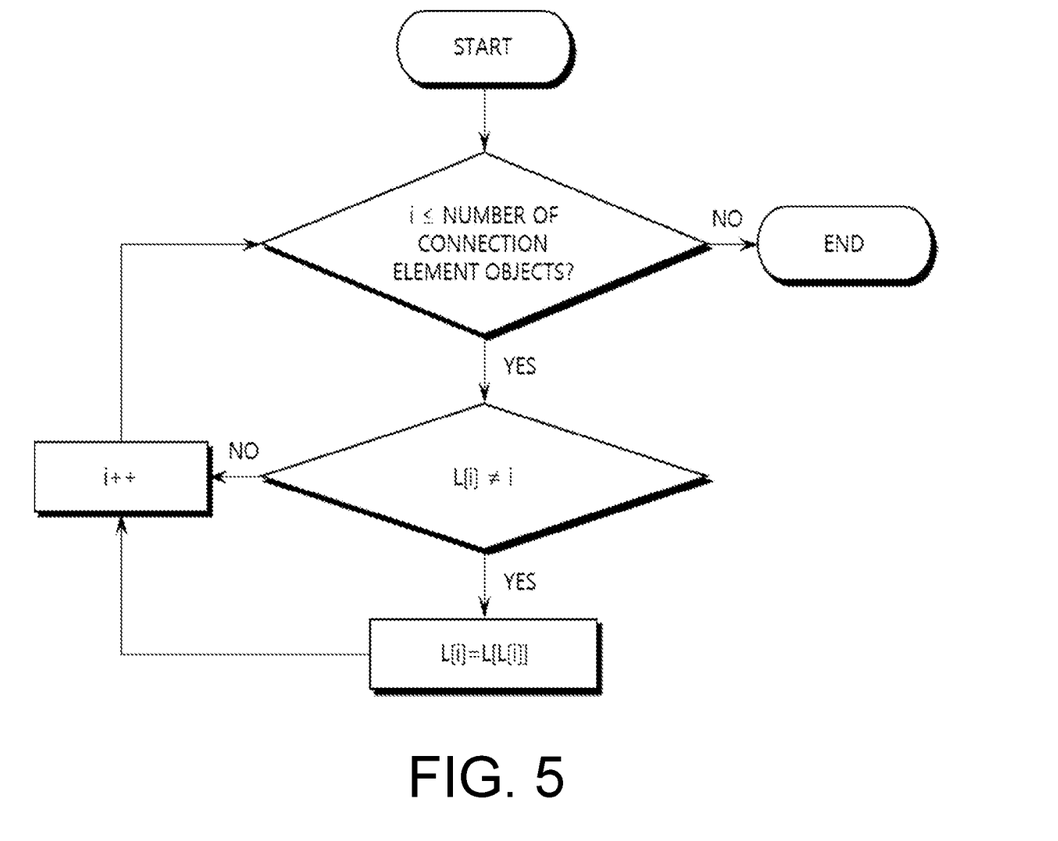
Figure 6:
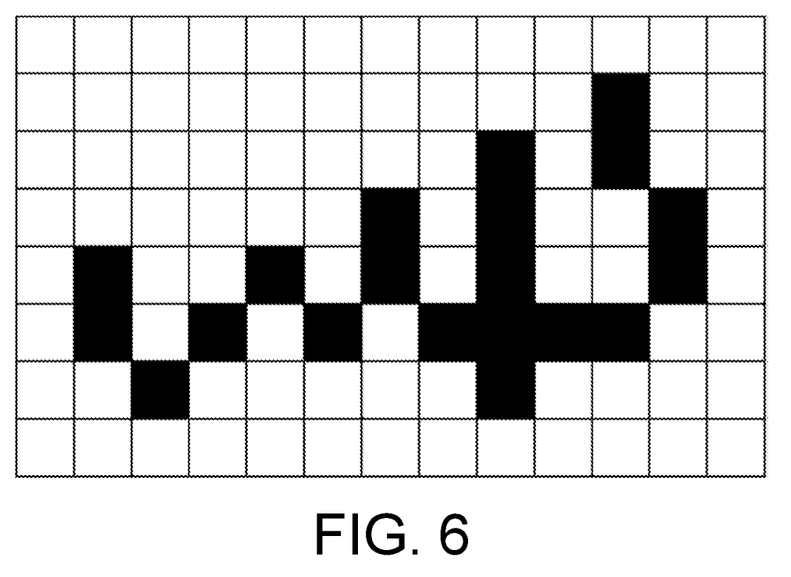
FIGS. 6 to 16 are diagrams for describing a process of executing the method of extracting and labeling connected elements of images shown in FIG. 2.

Hereinafter, a process of extracting connection element objects in an image as shown in FIG. 6 will be described in detail with reference to the flowcharts of FIGS. 3 to 5.

FIG. 6 is a diagram showing an enlarged image to facilitate checking of the value of each pixel. In the method of extracting and labeling connected elements of images according to the present embodiment, a threshold is set as the reference of brightness values of pixels and, when the brightness value of each pixel is lower than the threshold, it is determined that a connection element object exists. Various methods known in the art may be used as a method of defining the criterion of a threshold and confirming whether a connection element object associated with each pixel exists.

For convenience, the present embodiment will be described based on the case of extracting connected elements by using a black and white image as shown in FIG. 6. However, the method of extracting connected elements may be modified by setting a criterion in various ways according to the type of an image. For example, a color image may be used by converting it to a grayscale image in an appropriate way or a criterion may be set by using color coordinate values.

Figure 3:
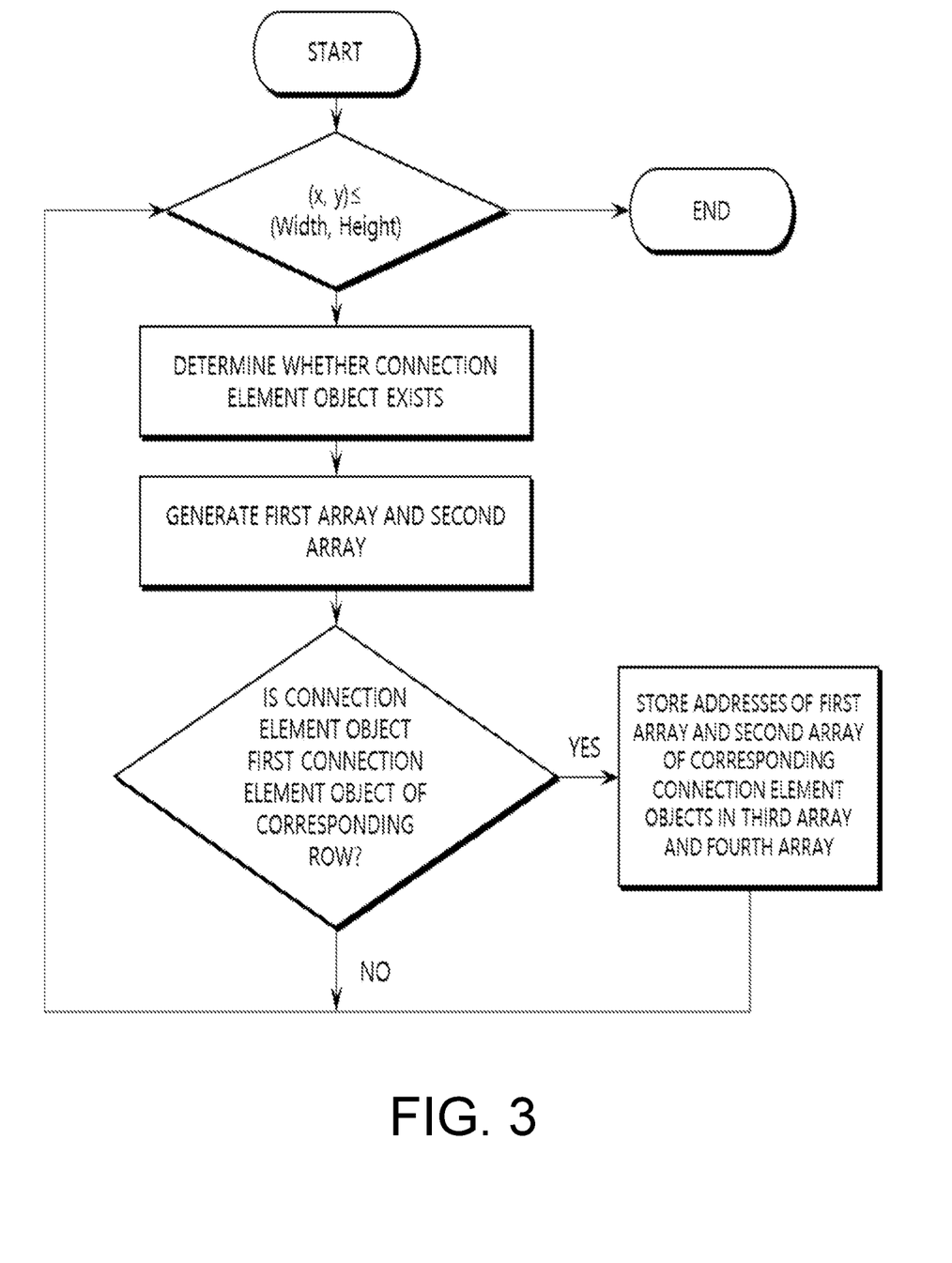
FIGS. 3 to 5 are flowcharts for describing operations of the method of extracting and labeling connected elements of images shown in FIG. 2 in detail.

Referring to FIG. 3, the first label module 100 searches pixels connected to one another in the horizontal direction from the uppermost row, extracts pixels connected to one another in the row-wise direction as connection element objects, and sequentially assigns identification numbers and label numbers (operation (a); S100).

Figure 7:
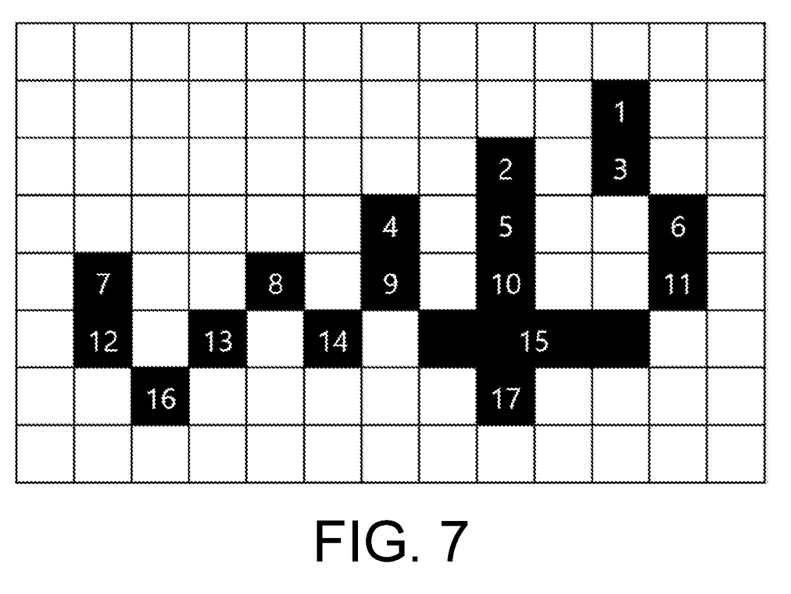

In the present embodiment, as shown in FIGS. 6 and 7, 17 connection element objects are extracted by the first label module 100, and identification numbers and label numbers are sequentially assigned thereto. Identification numbers and label numbers from 1 are sequentially assigned to connection element objects initially extracted by the first label module 100. Therefore, after operation (a) is performed, the identification number and the label number of each connection element object are identical to each other.

The first label module 100 generates a first array and a second array as shown below in order to effectively manage connection element objects.

i is an identification number sequentially assigned to each connection element object.

The first array is defined as L[i] below. L[i] is the label of an i-th connection element object. The first array initially generated by the first label module 100 is defined as L[i]=i.

The second array is defined as B[i] below. B[i] is an array storing a start point, an end point, and a row number of the i-th connection element object. The x-coordinate of the start point, the x-coordinate of the end point, and the row number of the i-th connection element object are defined as B[i].left, B[i].right, and B[i].row, respectively.

Values of the first array and the second array of a first connection element object based on the image shown in FIG. 7 are as shown in the table below. The values below are sequentially calculated from 0 for a first row and a first column, respectively.

TABLE 1

Examples of First Array and Second Array

| Variable Name | Value |
|---|---|
| L[1] | 1 |
| B[1].left | 10 |
| B[1].row | 1 |
| B[1].right | 10 |

In the present embodiment, the first label module 100 generates a first array and a second array each having 17 elements in the same manner as described above. The first label module 100 searches pixels of an image from the top row in the rightward direction, recognizes that pixels bordering on each other are connected to each other when pixel values thereof exceed a threshold, extracts independent connection element objects, and generates a first array and a second array corresponding to the connection element objects.

Here, referring to FIG. 3, while the first label module 100 is performing operation (a), when a connection element object appears in each pixel row for the first time in the rightward direction, the first label module 100 sequentially stores information regarding corresponding connection element objects in a third array and a fourth array and manage the information. A third array LY[j] includes addresses of first array elements L[i] of a corresponding connection element object, and a fourth array BY[j] includes addresses of second array elements B[i] of the corresponding connection element object. In the case of the image shown in FIG. 7, since there are six pixel rows in which connection element objects exist, the third array LY[j] and the fourth array BY[j] each having six array elements are generated by the first label module 100. The table below summarizes the correspondence among first to fourth arrays.

TABLE 2

Third Array and Fourth Array

| Variable Name | Variable | |
|---|---|---|
| Third Array | LY[j] | &L[i] |
| Fourth Array | BY[j] | &B[i] |

For example, in the case of FIG. 7, connection element objects 1, 2, 4, 7, 12, and 16 are connection element objects that appear for the first time in corresponding rows, respectively. Among them, the correspondence between the first to fourth arrays for connection element objects 1 and 4 is summarized in the table below. A third array and a fourth array are sequentially generated for each of connection element objects 2, 7, 12, and 16 as shown below.

TABLE 3

Relationships Between First Array and Second Array and Between Third Array and Fourth Array

| Label Number of connection element object | First to Fourth Arrays | |
|---|---|---|
| 1 | LY[1] | &L[1] |
|   | BY[1] | &B[1] |
| 4 | LY[3] | &L[4] |
|   | BY[3] | &B[4] |

In this regard, by storing information regarding a first connection element object of each row in a third array and a fourth array, in operation (b) to be described later, checking whether connection element objects of adjacent rows are connected to each other and updating label numbers may be performed more effectively.

Figure 4:
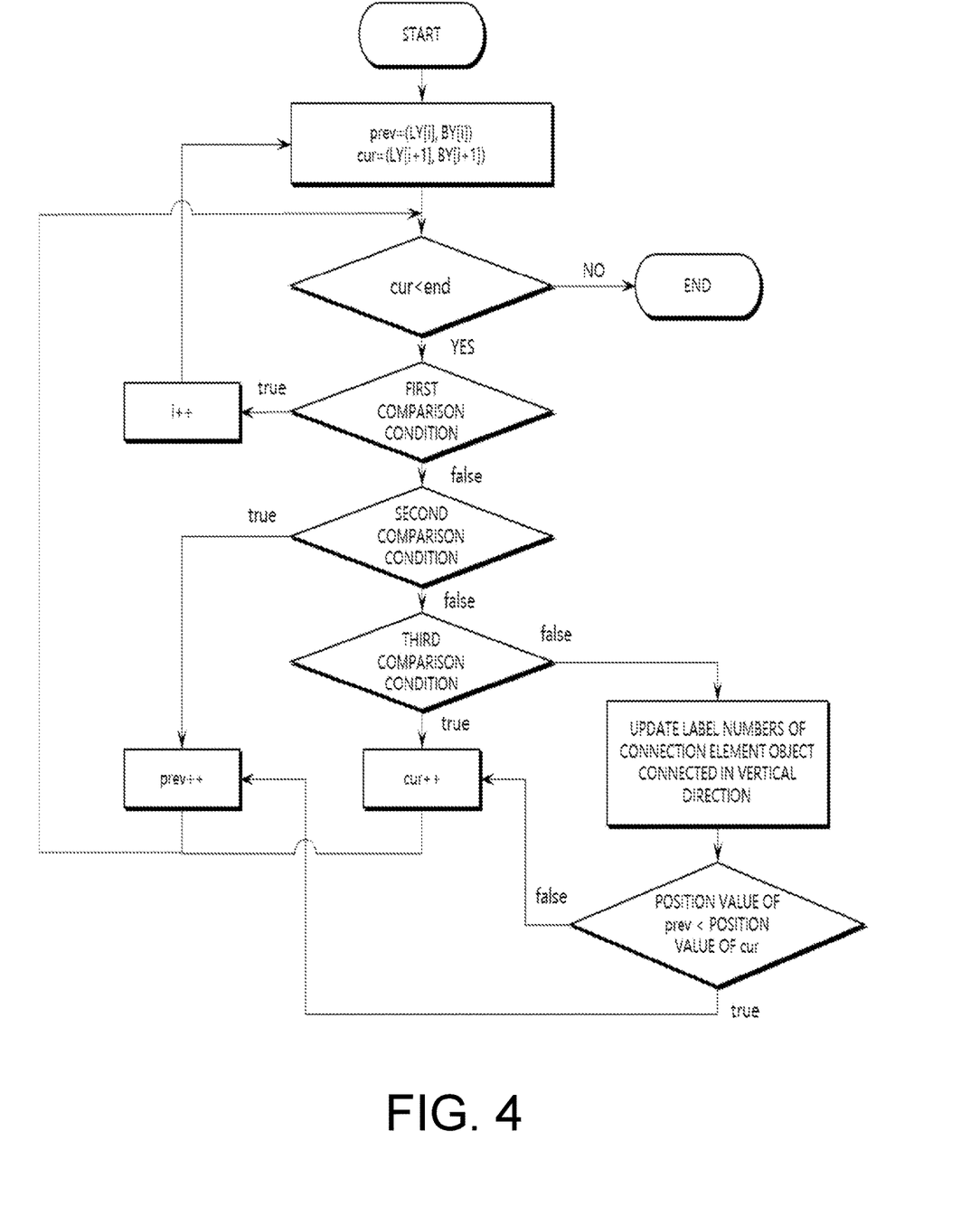

As described above, when operation (a) is completed, the second label module 200 sequentially extracts connection element objects connected to each other in rows bordering on each other as shown in FIG. 4 (operation (b)).

In order to explain the operation (b) in detail, a preceding label number, a following label number, a header object, a head value, and a final head value will be defined and described below.

When comparing the label numbers of two different connection element objects, the smaller label number becomes the preceding label number and the larger number becomes the following label number. In other words, the preceding label number is a label number going in advance, and the following label number is a label number coming after.

A header object is defined as "a connection element object having an identification number identical to a specific label number". In operation (a), when an identification number and a label number are initially assigned to each connection element object, the identification number and the label number have the same value, and thus the relationship L[i]=i is established. In other words, an identification number i and a label number L[i] of any connection element object have the same value. However, since label numbers of some connection element objects are updated in the process described below from operation (b), the "header object" is used to track connection element objects associated with the updated label numbers.

When the label number of the i-th connection element object is updated to 2, the values of a first array and a second array of the header object corresponding to the label number '2' become L[2] and B[2], respectively. The label number of a header object corresponding to the label number of the header object with the label number '2' becomes L[L[2]].

A process of performing operations (b) to (e) will be described with reference to FIG. 4 based on the concept as described above.

In the descriptions below, an 'i'-th element of a third array and a fourth array will be expressed as 'prev', and an 'i+1'-th element will be expressed as 'cur'. prev and cur have two values: label number values LY[i] and LY[i+1] and position values BY[i] and BY[i+1], respectively.

Referring to FIG. 4, the second label module 200 determines whether connection element objects border on each other according to a result of each comparison condition and changes a comparison target or updates a label number. This process is repeated until the last connection element object in which cur is detected.

A first comparison condition indicates when the y-coordinate difference between prev and cur is not 1, wherein, when the first comparison condition is true, the y-coordinate difference is not 1. In other words, when the first comparison condition is true, it means that prev and cur do not border on each other.

A second comparison condition and a third comparison condition are to determine whether connection element objects border on each other in diagonal directions. The second comparison condition indicates a case where a value right of prev is smaller than a value left−1 of cur. When the second comparison condition is true, it means that prev cannot border on any portion of cur in a downward and rightward direction. The third comparison condition indicates a case where a value left of prev is greater than a value right+1 of cur. When the third comparison condition is true, it means that prev cannot border on any portion of cur in a downward and leftward direction.

When the second comparison condition or the third comparison condition is true, a comparison target is changed to a next element in a corresponding row. As described above, since the third array and the fourth array are arrays corresponding to the addresses of the first array and the second array, respectively, the comparison target may be easily changed to a next connection element object located in the same row through an operation like prev++ and cur++.

When both the second comparison condition and the third comparison condition are false, it means that at least portions of prev and cur are adjacent and connected to each other in the vertical direction (column-wise direction or y-axis direction). As such, when connection element objects bordering on each other in the vertical direction are determined, at least one of the label numbers of the connection element objects bordering on each other is changed, such that the label numbers of the connection element objects have the same value. The same label number of different connection element objects means that the connection element objects are connected to each other.

When it is determined connection element objects of adjacent rows are connected to each other as described above, the second label module 200 updates the label numbers of the connection element objects connected to each other through a procedure as described below. Before describing a detailed process of updating the label numbers of connection element objects bordering on to each other, a process of obtaining the final head value will be described.

Obtaining the final head value of a specific connection element object will be defined as a GetHead($L_{now}$) function below. The initial head value is defined as a current label number $L_{now}$ of a connection element object. In this state, Equation 1 below is repeatedly performed until an updated head value H and a label number L[H] of a header object corresponding to the head value H have the same value (H=L[H]). in other words, a head value obtained as a result of repeating Equation 1 below until the head value H and the label number L[H] of the header object corresponding to the head value H have the same value (H=L[H]) is the final head value GetHead($L_{now}$).

$$H \leftarrow L[H] \qquad \text{[Equation 1]}$$

H: head value, L[H]: label number of a connection element object with an identification number H Such a final head value means the label number of the uppermost connection element object among connection element objects connected to the connection element object in the upward direction. In particular, even when the shape of an image to be inspected is very complicated and connection element objects are connected to one another in a highly complicated structure, the label number of the uppermost connection element object may be obtained without an error by using a final head value.

When connection element objects prev and cur connected to each other are found in adjacent rows through operation (b), the second label module 200 calculates final head values $H_p$ and $H_c$ of the connection element objects connected to each other (operation (c)).

By using head values and final head values defined as described above, the second label module 200 updates the label numbers of connection element objects bordering on each other according to the procedure shown in the table below (operation (d)).

TABLE 4

Label Number Updating Procedure

| Detailed Steps Number | Label Number Updating Procedure |
| --- | --- |
| 1 | p: prev.label, c: cur.label |
| 2 | $H_p \leftarrow$ GetHead(p), $H_c \leftarrow$ GetHead(c) |
| 3 | $L_{new} \leftarrow$ min(p, c, $H_p$, $H_c$) |
| 4 | $L[H_c] \leftarrow L_{new}$ |
| 5 | $c \leftarrow L_{new}$ |
| 6 | $L[H_p] \leftarrow L_{new}$ |
| 7 | $p \leftarrow L_{new}$ |

The second label module 200 sets the label number (smallest value) with the earliest order among label numbers c and p of two connection element objects that are currently to be compared with each other and final head values $H_p$ and $H_c$ of the two connection element objects as a renew label number $L_{new}$ (operation (d)). Next, all of the label numbers c and p of the two connection element objects that are currently to be compared with each other and label numbers $L[H_p]$ and $L[H_c]$ of header objects corresponding to the final head values $H_p$ and $H_c$ are updated to the renew label number $L_{new}$ (operation (e)).

As the second label module 200 repeatedly tracks the label numbers L[p] and L[c] of the header objects and refer to the final head values $H_p$ and $H_c$, the label numbers of connection element objects that are currently being compared with each other are updated by referring to even label numbers of connection element objects existing in rows prior to two rows that are currently being compared with each other. Also, instead of updating only the label numbers of two connection element objects that are currently to be compared with each other to the renew label number $L_{new}$, the label numbers $L[H_p]$ and $L[H_c]$ of header objects corresponding to the final head values Hp and Hc are updated to the renew label number $L_{new}$ by using the concept of a header object of a final head value of an upper connection element object connected to the connection element objects. By using this method, when a label number with an earlier order appears in the process of comparing connection element objects in rows bordering on each other, the label numbers of connection element objects of the topmost level respectively connected to the connection element objects being compared with each other are also updated according to $L[H_c]\leftarrow L_{new}$ and $L[H_p]\leftarrow L_{new}$, by using the label number with an earlier order, and thus the label number of a connection element object of an upper level is always maintained to the smallest value (label number with the earliest order).

In this regard, since the second label module 200 sequentially updates label numbers for each row by referring to label numbers of connection element object belonging to rows prior to two rows that border on each other and are currently to be compared with each other, the label numbers $L[H_c]$ and $L[H_p]$ of the header objects of the final head values as described above automatically refer to the label numbers of connection element objects belonging to the uppermost row connected to prev and cur. Therefore, when the second label module 200 updates the label numbers $L[H_c]$ and $L[H_p]$ of the header objects of the final head values every time to the renew label number $L_{new}$, even when a connection element object 1 and a connection element object 7 are connected to each other through connection element objects through a complicated path having shape in which U-shapes are repeated as shown in FIG. 7, the label number of the connection element object 7 may be updated to the smallest value among label numbers of connection element objects connected to one another.

Figure 8:
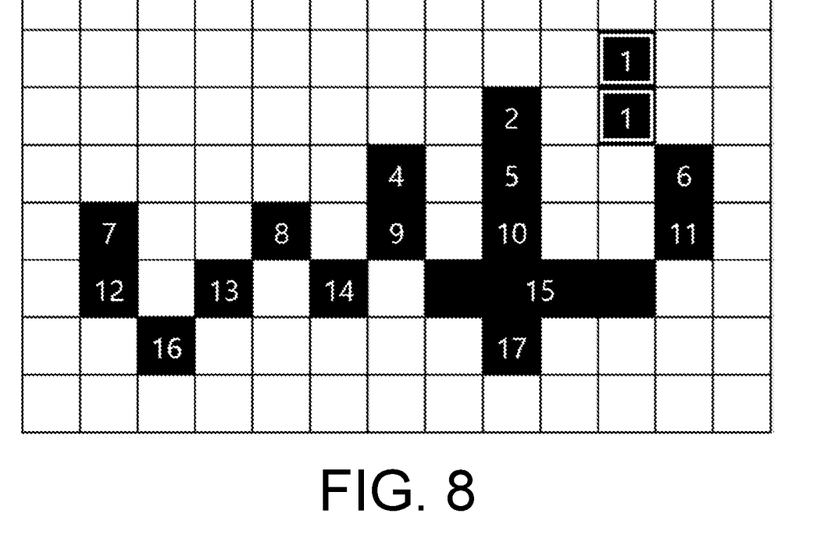

A process of comparing connection element objects 1 and 2 will be described below with reference to FIGS. 7 and 8. Since the connection element objects 1 and 2 are connection element objects that appear for the first time in corresponding rows, respectively, the relationship between the third array and the fourth array as shown in Table 3 is applied thereto. At this time, prev=(LY[1], BY[1]), cur=(LY[2], BY[2]). Since the connection element object 1 and connection element object 2 are in rows bordering on each other, the first comparison condition is false. Since the rightmost coordinate of the connection element object 1 is greater than the leftmost coordinate of the connection element object 2, the second comparison condition is also false. Since the leftmost coordinate of the connection element object 1 is greater than the rightmost coordinate of the connection element object 2, the third comparison condition is true. Referring to FIG. 4, a cur++ operation is performed.

As described above, since the third array and the fourth array refer to addresses of the first array and the second array, respectively, when prev++ and cur++ operations are performed with reference to FIG. 4, prev and cur indicate a first array and a second array of a next connection element object in the row-wise direction, respectively. Since the connection element object of number 1 does not border on the connection element object of number 2 of a third row, a connection element object 3 is indicated by cur++. Accordingly, cur=(&L[3], &B[3]).

In this state, referring to FIG. 7, p=1, c=3, L[p]=1, and L[c]=3. Since the connection element object 1 and the connection element object 3 border on each other, both the first comparison condition and the third comparison condition are false. Therefore, the label numbers thereof are updated according to Table 4. Since the label numbers of the connection element object 1 and the connection element object 3 are identical to the label numbers of head objects of the connection element object 1 and the connection element object 3, current label numbers thereof are final head values, respectively. Since the minimum value of the label number and the final head value is 1, the renew label number $L_{new}$ is 1. Referring to Table 4, all values of p, c, L[p], and L[c] are updated to $L_{new}$=1. FIG. 8 shows a state in which the label number of the connection element object number 3 is updated to L[3]=1 according to the process as described above.

Figure 9:
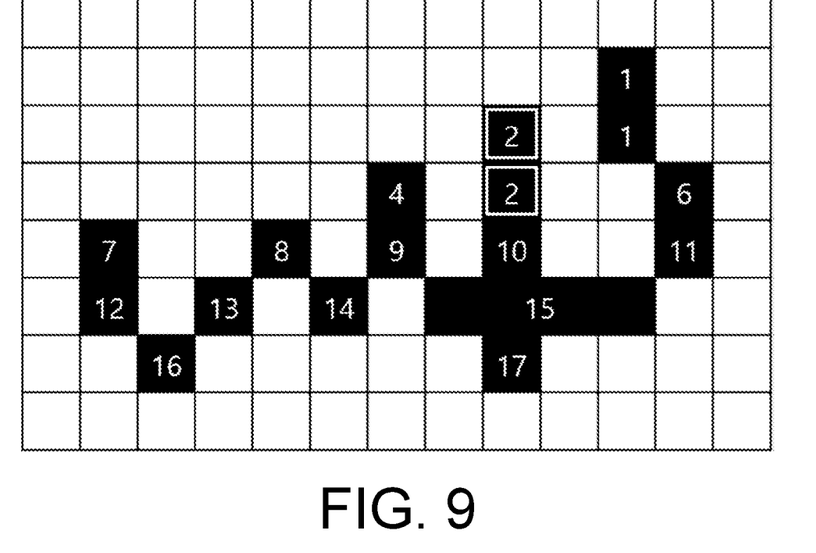

Since there is no more connection element object in the rightward direction in a second row and the third row, operation i++ is performed according to the flowchart of FIG. 4 and the method proceeds to an operation of comparing the third row and a fourth row. Initially, prev=(LY[2], BY[2]), cur=(LY[3], BY[3]), and thus prev and cur indicate the connection element object 2 and a connection element object 4, respectively. Since the connection element object 2 and the connection element object 4 do not border on each other, cur indicates a connection element object 5 through a cur++ operation. Therefore, the connection element object 2 (prev) is compared with the connection element object 5 (cur). At this time, p=2 and the final head value of the connection element object 2 is also $H_p$=2. c=5, and the final head value of the connection element object 5 is also $H_c$=5. Since the minimum value of the label number and the final head value is 2, the renew label number $L_{new}$ is 2. Referring to Table 4, all values of p, c, L[p], and L[c] are updated to $L_{new}$=2. FIG. 9 shows a state in which the label number of the connection element object number 5 is updated to L[5]=2 according to the process as described above.

Figure 10:
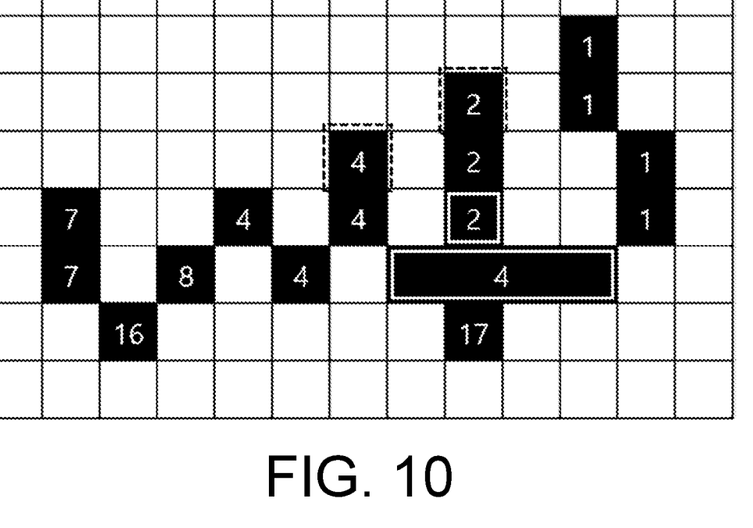

When the process proceeds until an operation of comparing a connection element object number 9 and a connection element object number 15, the state as shown in FIG. 10 is obtained.

Next, with reference to FIG. 10, a process of comparing a connection element object 10 and the connection element object 15 will be described. Since the connection element object 10 is not connected to connection element objects 12, 13, and 14, the label number of the connection element object 10 is updated by being compared with the label number of the connection element object 15 in a next row.

Referring to FIG. 10, p=2, c=4, L[p]=2, and L[c]=4. The final head value of the connection element object 10 is the label number of the connection element object 2 indicated by a dashed line in FIG. 10. Therefore, $H_p$=2. The final head value of the connection element object 15 is the label number of the connection element object 4 indicated by a dashed line in FIG. 10. Therefore, $H_c$=4. Since the minimum value among p, c, $H_p$, and $H_c$ is 2, $L_{new}$=2. Referring to Table 4, all values of p, c, L[$H_p$], and L[$H_c$] are updated to $L_{new}$=2.

Figure 11:
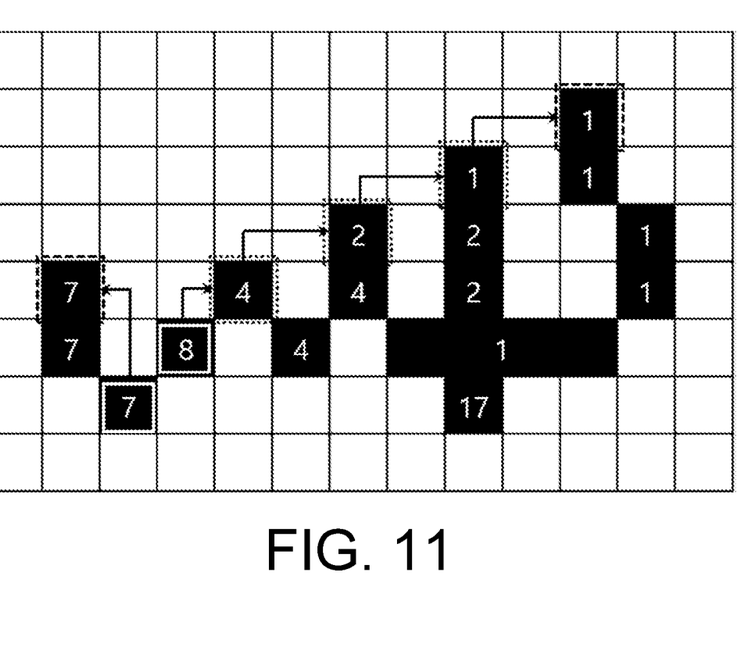

When the process proceeds, the state as shown in FIG. 11 is obtained. FIG. 11 is a diagram showing a state in which a comparison between the connection element object number 12 and a connection element object number 16 is completed. In this state, a process of comparing a connection element object 13 and the connection element object 16 indicated by white lines will be described with reference to FIG. 11. Referring to FIG. 11, p=8, c=7, L[p]=4, and L[c]=7.

A process of obtaining the final head value of the connection element object 13 is as follows. The current label number of the connection element object 13 is p=L[13]=8. Therefore, since L[L[13]]=L[8]=4, Hp is updated to 4, and, when the updated $H_p$ is used, L[$H_p$=4]=2. It may be seen in FIG. 11 that $H_p$ is updated to 2 again, and, when the updated $H_p$ is used, L[2]=1. $H_p$ is updated to 1 again, and, since L[1]=1, a final result is GetHead(8)=$H_p$=1. As indicated by the arrow line in FIG. 11, when a process of referring to the final head value to connection element objects in an upper level is repeated, the smallest value among label numbers of other connection element objects reflected in previous updates may be found.

When the process as described above is performed for the connection element object 16, the final head value $H_c$ is 7.

Figure 12:
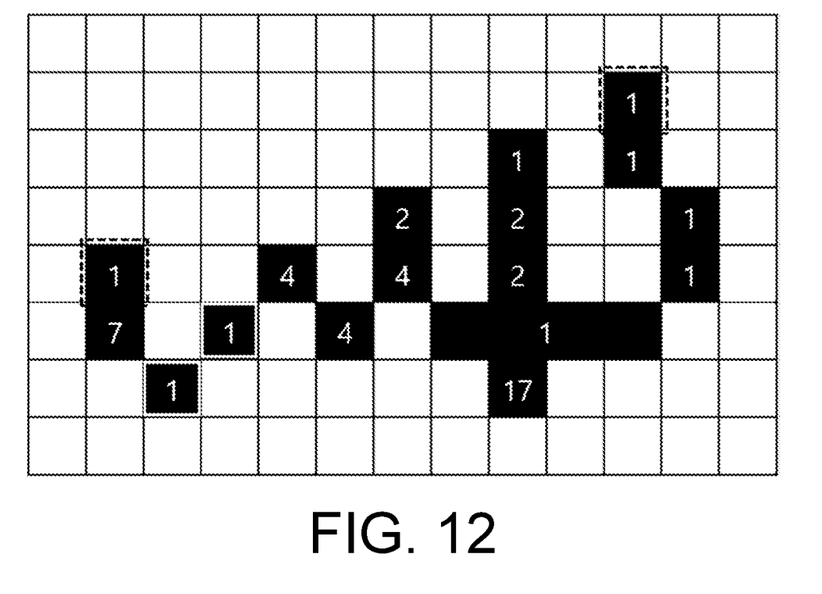

Since the minimum value among p, c, $H_p$, and $H_c$ is 1, $L_{new}$=1. Referring to Table 4, all values of p, c, L[$H_p$], and L[$H_c$] are updated to $L_{new}$=1. FIG. 12 is a diagram showing a result of updating all values of p, c, L[$H_p$], and L[$H_c$] to $L_{new}$=1 as described above. Referring to the part indicated by the dashed line, it may be seen that the label numbers of connection element objects corresponding to the final head value as well as those of the two connection element objects currently being compared are updated. In other words, when a label number smaller than the final head value appears in the process of comparing connection element objects of rows bordering on each other, the final head value is updated to be maintained at the smallest value.

Figure 13:
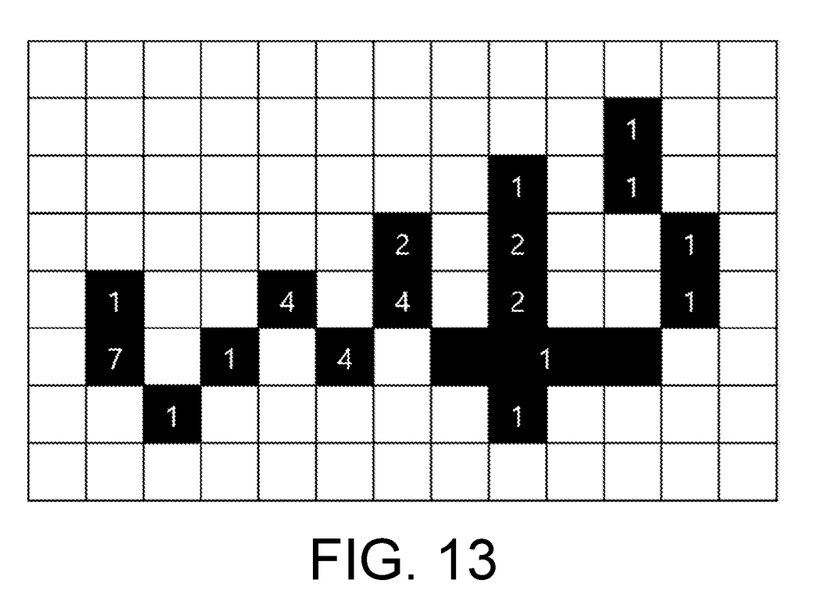

FIG. 13 is a diagram showing a state in which label numbers are updated to the last connection element object, that is, a connection element object 17. In other words, when operations (b) to (e) as described above are repeatedly completed for all rows of a target image, the label numbers of connection element objects are updated to the state as shown in FIG. 13. Referring to FIG. 13, it may be confirmed that there are connection element objects still with different label numbers even though the connection element objects are connected to one another.

As described above, when operations (b) to (e) are sequentially performed for each of connection element objects existing in rows bordering on each other, in the case of connection element objects having a relatively simple connection shape, the same label number may be assigned to connection element objects connected to one another.

However, in the case of an image including connected elements having a relatively complicated connection shape as shown in FIG. 6, even after operation (e) is completed, different label numbers may be assigned to some of connection element objects connected to one another as shown in FIG. 13. To resolve the incompleteness, the third label module 300 performs operation (f) (S300).

The third label module 300 performs operation (f) by updating label numbers of connection element objects whose identification numbers are not identical to label numbers among connection element objects to the label numbers of header objects corresponding to the label numbers of the connection element objects. FIG. 5 is a flowchart showing a process of performing operation (f).

When the identification number i of a connection element object is not identical to the label number L[i] of the connection element object, it means that the label number of the connection element object has been updated once or more. In this regard, the third label module 300 updates the label numbers of connection element objects corresponding to 'L[i]≠i' to a label number L[L[i]] of a corresponding header object, thereby complementing the incompleteness of the operation (b).

Figure 14:
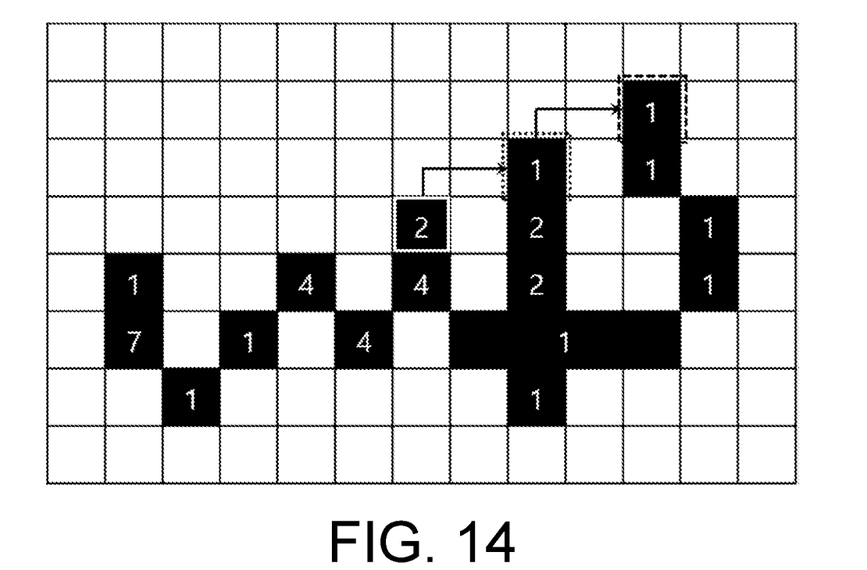

For example, in FIG. 13, a label number L[4] of a connection element object having the identification number 4 is '2'. Therefore, a label number L[L[4]] of the header object corresponding to the label number of the connection element object 4 is 'L[2]', and 'L[2]' is '1'. FIG. 14 is a diagram showing a process of updating the label number of the connection element object 4 by referring to the label number of a header object as described above.

Figure 15:
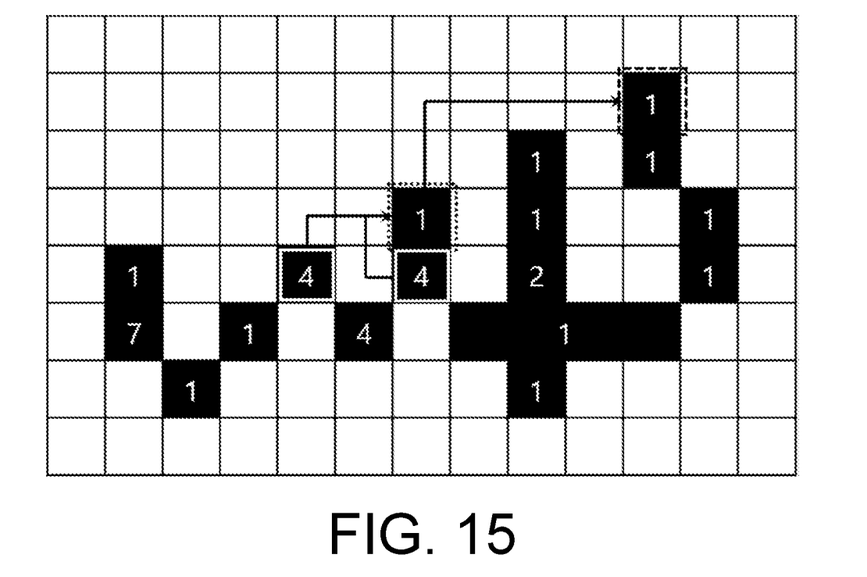

FIG. 15 is a diagram showing a process of updating the label numbers of connection element object whose identification numbers are 8 and 9, respectively. In FIG. 15, a label number L[8] of a connection element object whose identification number is 8 is '4'. Therefore, a label number L[L[8]] of the header object corresponding to the label number of a connection element object 8 is 'L[4]', and 'L[4]' is '1'. The label number of a connection element object number 9 is also updated to 1 through the same process.

Figure 16:
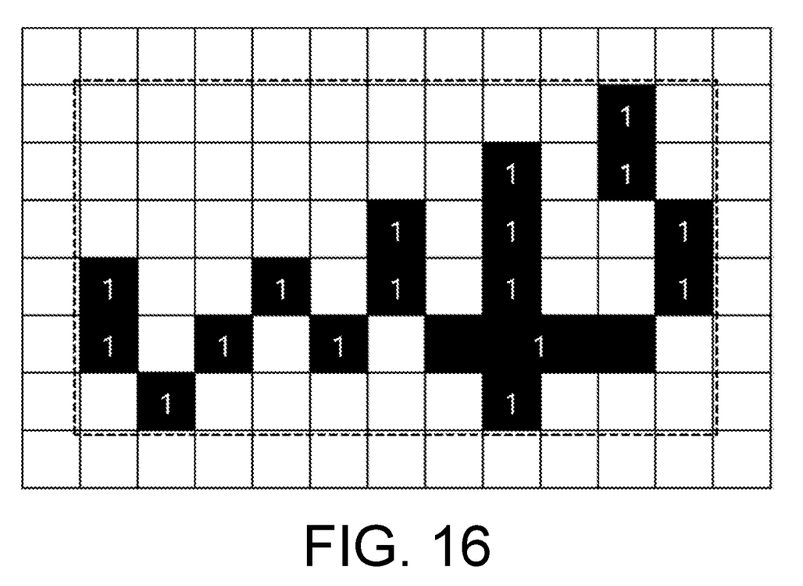

Therefore, the third label module 300 updates all of the label numbers of connection element objects to which label numbers other than 1 are assigned even though the connection element objects are connected to one another to '1' as shown in FIG. 16.

As described above, during the process of performing operations (b) to (e), every time the second label module 200 updates the label number of each connection element object, label numbers of connection element objects, which correspond to a final head value and are connected to the corresponding connection element object, are updated. Therefore, the final head value is the most accurate label number. Operation (f) performed by the third label module 300 is a process of updating the label numbers of connection element objects connected to a corresponding header object based on a final head value associated with a preceding label number. When operation (f) is completed as shown in FIG. 15, it may be confirmed that the same label number is assigned to all connection element objects connected to one another.

As described above, when operation (f) is completed, the group module 400 extracts and groups connection element objects having the same label number (operation (d); S400). Various methods may be used by the group module 400 to group connection element objects having the same label number. For example, the group module 400 may generate a new array and store identification numbers of connection element objects belonging to the same group therein.

When needed, the group module 400 may calculate the outermost boundary of connection element objects connected to each other by obtaining the maximum values and the minimum values of the x-coordinates and y-coordinates of connection element objects belonging to the same group.

Although the present disclosure has been described with preferred examples, the scope of the present disclosure may be variously modified from those described and illustrated above.

For example, descriptions above have been given for a case of recognizing connection element objects bordering on one another in diagonal directions as connection element objects connected to one another and updating label numbers thereof. However, in some cases, label numbers may be updated, such that connection element objects bordering on one another in diagonal directions are not recognized as connection element objects connected to one another.

Also, descriptions above have been given for a case in which rows are sequentially compared in a downward direction and identification numbers and label numbers are assigned to connection element objects in the same row in a rightward direction. However, the rule of assigning identification numbers and label numbers of connection element objects may vary as needed, and thus a criterion for updating label numbers may be appropriately modified.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of extracting and labeling connected elements of images by examining pixels of an image and recognizing and extracting connection element objects formed as pixels bordering on one another are connected to one another, the method comprising:

operation (a), by a first label module, of searching pixels of the image in a horizontal direction, extracting pixels connected to each other in the same row as connection element objects, and sequentially assigning identification numbers and label numbers to the connection element objects;

operation (b), by a second label module, of sequentially extracting the connection element objects connected to each other from rows bordering on each other;

operation (c), by the second label module, of setting label numbers p and c of the connection element objects connected to each other to initial head values Hp and Hc, respectively, and obtaining final head values Hp and Hc of the connection element objects connected to each other by repeating Equation 1 below until head values Hp and Hc updated by Equation 1 and label numbers L[Hp] and L[Hc] of connection element objects having the head values Hp and Hc as identification numbers thereof have the same values, respectively;

operation (d), by the second label module, of setting a smallest value of the label numbers p and c of the connection element objects connected to each other in rows bordering on each other and the final head values Hp and Hc of the connection element objects connected to each other, as a renew label number $L_{new}$; and operation (e), by the second label module, of updating the label numbers p and c of the connection element objects connected to each other and the label numbers L[Hp] and L[Hc] of the connection element objects having the final head values Hp and Hc as the identification numbers thereof to the renew label number $L_{new}$, wherein, after operation (a) is performed, the second label module sequentially performs the operations (b) to (e) for all rows bordering on each other $$H \leftarrow L[H] \qquad \text{[Equation 1]}$$

H: head value, L[H]: label number of a connection element object with an identification number H.

2. The method of claim 1, further comprising operation (f), by a third label module, of defining the connection element objects having an identification number identical to a specific label number as a header object and updating label numbers of connection element objects, whose identification numbers are not identical to the label numbers among the connected elements, to the label number of the header object corresponding to the label numbers.

3. The method of claim 2, further comprising operation (g), by a group module, extracting and grouping the connection element objects having the same label number.

4. The method of claim 2, wherein, in operation (a), the first label module stores label numbers of the connection element objects in a first array L[i] and stores x-coordinates of start points, x-coordinates of end points, and row numbers of the connection element objects as B[i].left, B[i].right, and B[i].row in a second array B[i], wherein B[i] is an array storing a start point, an end point, and a row number of the i-th connection element object, B[i].left is the x-coordinate of the start point, B[i].right is the x-coordinates of end points, and B[i].row is the row number of the i-th connection element object.

5. The method of claim 3, wherein, in operation (a), the first label module stores label numbers of the connection element objects in a first array L[i] and stores x-coordinates of start points, x-coordinates of end points, and row numbers of the connection element objects as B[i].left, B[i].right, and B[i].row in a second array B[i], wherein B[i] is an array storing a start point, an end point, and a row number of the i-th connection element object, B[i].left is the x-coordinate of the start point, B[i].right is the x-coordinates of end points, and B[i].row is the row number of the i-th connection element object.

6. The method of claim 4, wherein, in operation (f), the third label module recognizes a label number of the header object corresponding to a label number 'i' as L[i] and recognizes a label number of a header object corresponding to the label number of the header object corresponding to the label number 'i' as L[L[i]].

7. The method of claim 4, wherein, in operation (a), the first label module extracts the connection element objects that appear for a first time based on pixel rows of the image, and sequentially stores addresses of first array elements L[i] of the connection element objects in a third array LY[j], and addresses of second array elements B[i] of the connection element objects in a fourth array BY[j], and the second label module and the third label module perform operations (b) and (f) by using the third array LY[j] and the fourth array BY[j], respectively.

8. The method of claim 1, wherein, in operation (b), the second label module also recognizes the connection element objects bordering on one another in diagonal directions as being connected to one another.

9. The method of claim 2, wherein, in operation (b), the second label module also recognizes the connection element objects bordering on one another in diagonal directions as being connected to one another.

10. The method of claim 1, wherein, in operation (b), the second label module recognizes the connection element objects bordering on one another in diagonal directions as not being connected to one another.

11. The method of claim 2, wherein, in operation (b), the second label module recognizes the connection element objects bordering on one another in diagonal directions as not being connected to one another.

12. The method of claim 1, wherein operation (a) is performed by the first label module in a rightward direction from an uppermost row of the image, and operation (b) is performed by the second label module in the rightward direction from the uppermost row of the image.

13. The method of claim 2, wherein operation (a) is performed by the first label module in a rightward direction from an uppermost row of the image, and operation (b) is performed by the second label module in the rightward direction from the uppermost row of the image.

* * * * *